United States Patent
Balakrishnan et al.

(10) Patent No.: US 9,471,398 B2
(45) Date of Patent: *Oct. 18, 2016

(54) GLOBAL LOCK CONTENTION PREDICTOR

(71) Applicant: International Business Machines Corporation, Armonk, NY (US)

(72) Inventors: Ganesh Balakrishnan, Austin, TX (US); Srinivasan Ramani, Cary, NC (US); Brian M Rogers, Durham, NC (US); Ken V Vu, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,481

(22) Filed: Jun. 10, 2015

(65) Prior Publication Data
US 2016/0098299 A1    Apr. 7, 2016

Related U.S. Application Data

(63) Continuation of application No. 14/506,498, filed on Oct. 3, 2014.

(51) Int. Cl.
*G06F 9/44* (2006.01)
*G06F 9/46* (2006.01)
*G06F 9/52* (2006.01)
*G06F 9/50* (2006.01)

(52) U.S. Cl.
CPC ............... *G06F 9/52* (2013.01); *G06F 9/466* (2013.01); *G06F 9/5016* (2013.01); *G06F 9/526* (2013.01); *G06F 9/528* (2013.01)

(58) Field of Classification Search
CPC ............................................ G06F 9/34–9/548
See application file for complete search history.

(56) References Cited

U.S. PATENT DOCUMENTS

| | | | |
|---|---|---|---|
| 6,842,809 B2 | 1/2005 | Browning et al. | |
| 7,516,313 B2 | 4/2009 | Saha et al. | |
| 8,190,859 B2* | 5/2012 | Akkary | G06F 9/528 712/216 |
| 8,533,436 B2 | 9/2013 | Fryman et al. | |
| 8,533,719 B2 | 9/2013 | Fedorova et al. | |
| 2002/0199113 A1* | 12/2002 | Pfister | G06F 9/526 718/100 |

(Continued)

FOREIGN PATENT DOCUMENTS

WO    2006012103 A2    2/2006

OTHER PUBLICATIONS

Somogyi, Stephen, et al., "Memory Coherence Activity Prediction in Commercial Workloads", 2004, pp. 37-45.*

(Continued)

*Primary Examiner* — Thuy Dao
*Assistant Examiner* — Christopher Franco
(74) *Attorney, Agent, or Firm* — Kunzler Law Group; Steven Bennett

(57) ABSTRACT

A method for lock acquisition includes adding a current contention state of a lock to a contention history. The lock includes a memory location for storing information used for excluding accessing a resource by one or more threads while another thread accesses the resource. The method includes combining the contention history with a lock address for the lock to form a predictor table index, and using the predictor table index to determine a lock prediction for the lock. The prediction includes a determination of an amount of contention.

13 Claims, 7 Drawing Sheets

(56) References Cited

U.S. PATENT DOCUMENTS

| | | | | |
|---|---|---|---|---|
| 2003/0139918 A1* | 7/2003 | Hardwick | G06F 9/5011 | 703/22 |
| 2006/0161738 A1* | 7/2006 | Saha | G06F 9/3851 | 711/150 |
| 2007/0169002 A1* | 7/2007 | Kronlund | G06F 9/526 | 717/130 |
| 2008/0115042 A1* | 5/2008 | Akkary | G06F 9/528 | 714/806 |
| 2008/0163220 A1* | 7/2008 | Wang | G06F 9/467 | 718/101 |
| 2009/0125519 A1* | 5/2009 | Robison | G06F 9/528 | |
| 2010/0169623 A1 | 7/2010 | Dice | | |
| 2010/0229043 A1* | 9/2010 | Saha | G06F 9/466 | 714/35 |
| 2010/0275209 A1* | 10/2010 | Detlefs | G06F 9/526 | 718/102 |
| 2011/0107340 A1* | 5/2011 | Gupta | G06F 9/4881 | 718/102 |
| 2011/0145512 A1* | 6/2011 | Adl-Tabatabai | G06F 9/466 | 711/141 |
| 2012/0158684 A1* | 6/2012 | Lowenstein | G06F 9/526 | 707/704 |
| 2013/0046924 A1* | 2/2013 | Adl-Tabatabai | G06F 9/466 | 711/105 |
| 2015/0134896 A1* | 5/2015 | Adl-Tabatabai | G06F 9/52 | 711/105 |
| 2015/0178086 A1* | 6/2015 | Hughes | G06F 9/3806 | 711/125 |
| 2015/0220372 A1* | 8/2015 | Ban | G06F 9/3885 | 710/200 |
| 2015/0286586 A1* | 10/2015 | Yadav | G06F 9/528 | 711/152 |

OTHER PUBLICATIONS

Atoofian, Ehsan, et al., "Improving performance of software transactional memory through contention locality", 2013, pp. 527-547.*

Atoofian, Ehsan, "Speculative Contention Avoidance in Software Transactional Memory", 2011, pp. 1417-1423.*

Blake, Geoffrey, et al., "Proactive Transaction Scheduling for Contention Management", 2009, pp. 156-167.*

Pusukuri, Kishore Kumar, et al., "Lock Contention Aware Thread Migrations", Feb. 2014, pp. 369-370.*

Yu, Xiao, et al., "On Adaptive Contention Management Strategies for Software Transactional Memory", 2012, pp. 24-31.*

T.E. Anderson, The Performance of Spin Lock Alternatives for Shared-Memory Multiprocessors, IEEE Transactions of Parallel and Distributed Systems, vol. 1, No. 1, Jan. 1990.

John M. Mellor-Crummey and Michael L. Scott, Algorithms for Scalable Synchronization on Shared-Memory Multiprocessors, ACM Transactions on Computer Systems, Feb. 1991.

John M. Mellor-Crummey and Michael L. Scott, Scalable Reader-Writer Synchronization for Shared Memory Multiprocessors, http://www.cs.rochester.edu/~scott/papers/1991_PPPoPP_read_write.pdf, Apr. 1991.

Travis S. Craig, Building FIFO and Priority-Queuing Spin Locks from Atomic Swap, University of Washington Technical Report 93-02-02, Feb. 1993.

Beng-Hong Lim and Anant Agarwal, Waiting Algorithms for Synchronization in Large-Scale Multiprocessors, http://groups.csail.mit.edu/cag/pub/papers/pdf/waiting-algs.pdf, Aug. 1993.

Beng-Hong Lim and Anant Agarwal, Reactive Synchronization Algorithms for Multiprocessors, Massachusetts Institute of Technology, http://groups.csail.mit.edu/cag/pub/papers/pdf/reactive.pdf, Mar. 1994.

Yossi Lev, Victor Luchangco, and Marek Olszewski, Scalable Reader-Writer Locks, SPAA '09 Proceedings of the twenty-first annual symposium on Parallelism in algorithms and architectures, pp. 101-110, Aug. 2009.

Peter Magnusson, Anders Landin, and Erik Hagersten, Efficient Software Synchronization on Large Cache Coherent Multiprocessors, Swedish Institute of Computer Science Technical Report T 94:07, Feb. 1994.

Gary Graunke and Shreekant Thakkar, Synchronization Algorithms for Shared-Memory Multiprocessors, IEEE Computer, Jun. 1990.

Ravi Rajwar and Jim Goodman, Speculative Lock Elision: Enabling Highly Concurrent Multithreaded Execution, International Symposium on Microarchitecture, Dec. 2001.

IBM, IBM z/OS V1R12.0 documentation, IBM Knowledge Center, http://www-01.ibm.com/support/knowledgecenter/SSLTBW_1.12.0/com.ibm.zos.r12/zosr12home.html, Jun. 23, 2014.

* cited by examiner

GLOBAL LOCK CONTENTION PREDICTOR

FIELD

The subject matter disclosed herein relates to lock acquisition and more particularly relates to lock acquisition while reducing bus traffic.

BACKGROUND

A lock is a synchronization mechanism that is often used for enforcing mutual exclusion in a system with multiple threads contending for a resource. Software threads are typically elements of a process and are typically used in multi-core systems. Software threads typically are coordinated so that only one thread has access to a critical resource like a shared data, a critical section, etc. at any given instant in time. Locks typically ensure that only the thread owning the lock is allowed access to the critical section while the other threads have to retry later to gain access. Locks are typically implemented as a variable in a memory location. In one embodiment, when the lock variable is set to logic 0, the lock is free, and when a thread acquires the lock, the thread has to first check the lock variable to ensure it is free. If free, the thread acquires the lock by storing a logic 1 to the variable. Any other threads attempting to acquire the lock during this time will read a value of logic 1 in the lock variable and will have to retry lock acquisition. When the thread owning the lock is ready to release the lock, the thread stores the value of logic 0 into the variable. Other threads waiting to acquire the lock will compete for the lock and the winning thread will acquire the lock. The remaining threads will retry.

Two common strategies when a thread tries to acquire a lock and finds that the lock is owned by another thread are yielding and spinning. Yielding allows the thread owning the lock to continue to use the resource pertaining to the lock while the thread wanting the lock waits a period of time before attempting again to acquire the lock. A consequence of this strategy is that the lock may be released before the thread desiring to acquire the lock re-attempts to acquire the lock, thus delaying execution of the thread desiring the resource associated with the lock. Spinning is a strategy where the thread desiring the lock keeps trying to acquire the lock again and again until the thread acquires the lock. The consequence of spinning is increased bus traffic.

When a number of threads try to acquire a lock at the same time, the lock is said to be "contended." Contended locks generate a lot of traffic on the memory buses due to the nature of lock acquire/lock release and cache coherence protocols. Knowing if a lock is contended can be useful. If a thread knows that a lock is contended, the thread can yield without checking the lock variable, which can reduce bus traffic. Knowing if a lock is contended also has the benefit of reducing energy usage if the system is not loaded with threads or increasing throughput if threads from another process can be scheduled. If the lock is not contended, the thread can spin and immediately access the lock and benefit from lower lock acquire latency.

One common cache coherence strategy is the MESI coherence protocol, where MESI stands for Modified, Exclusive, Shared, and Invalid. The MESI coherence protocol is widely used and leads to scenarios with a lot of bus traffic for contended locks, especially with spinning.

BRIEF SUMMARY

An apparatus for lock acquisition is disclosed. A method and a computer program product also perform the functions of the apparatus. The apparatus includes a lock history module that adds a current contention state of a lock to a contention history. The lock includes a memory location for storing information used for excluding access to a resource by one or more threads while another thread accesses the resource. The apparatus includes a combination module that combines the contention history with a lock address for the lock to form a predictor table index, and a prediction module that uses the predictor table index to determine a lock prediction for the lock. The prediction includes a determination of an amount of contention.

A method for lock acquisition includes adding a current contention state of a lock to a contention history. The lock includes a memory location for storing information used for excluding accessing a resource by one or more threads while another thread accesses the resource. The method includes combining the contention history with a lock address for the lock to form a predictor table index, and using the predictor table index to determine a lock prediction for the lock. The prediction includes a determination of an amount of contention.

A computer program product for lock prediction is included. The computer program product includes a computer readable storage medium having program instructions embodied therewith. The program instructions are readable and/or executable by a processor for adding a current contention state of a lock to a contention history. The lock includes a memory location for storing information used for excluding accessing a resource by one or more threads while another thread accesses the resource. The program instructions are executable by a processor for combining the contention history with a lock address for the lock to form a predictor table index, and using the predictor table index to determine a lock prediction for the lock, the prediction including a determination of an amount of contention.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings.

DETAILED DESCRIPTION OF THE INVENTION

Figure 1:
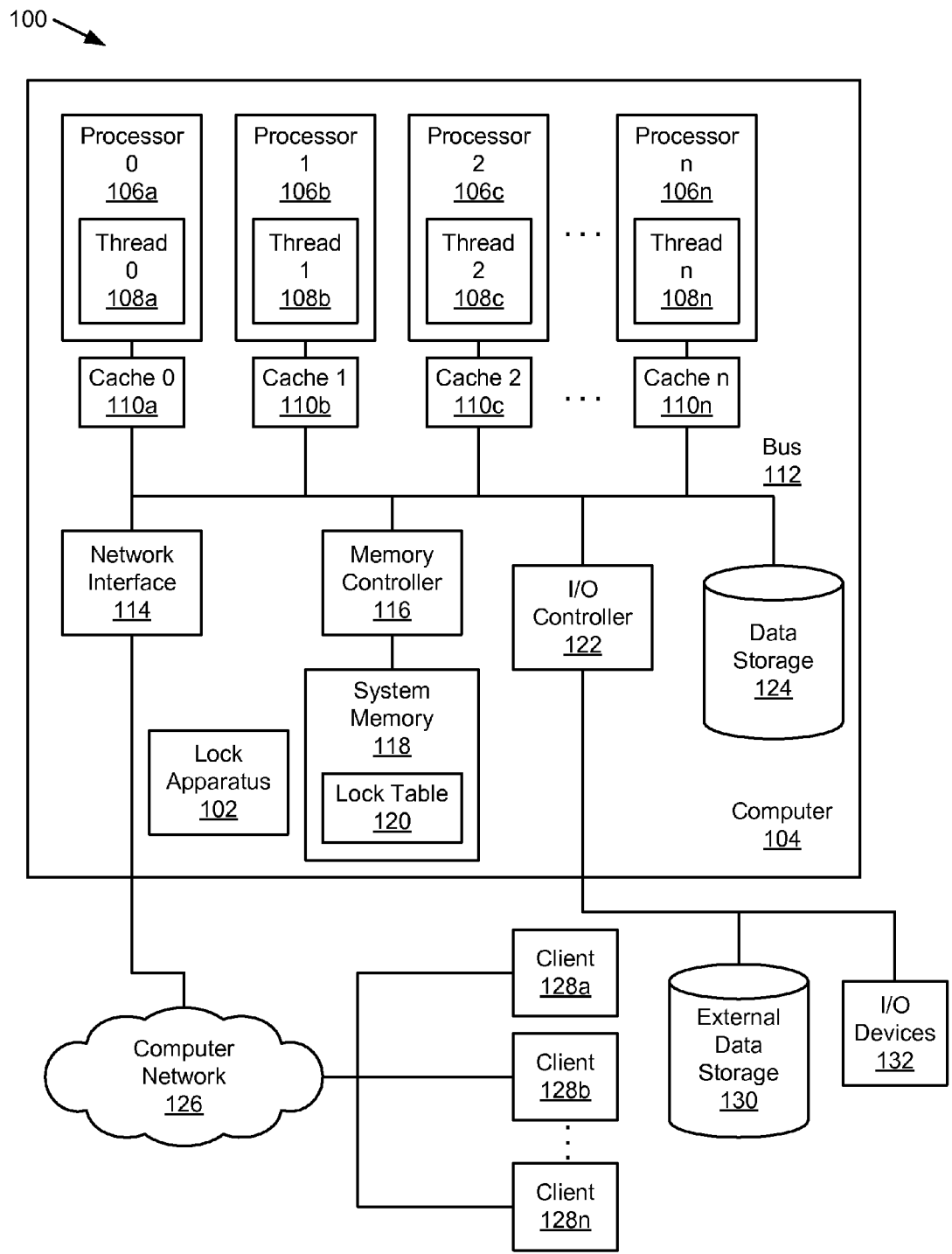
FIG. 1 is a schematic block diagram illustrating one embodiment of a system for lock acquisition in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating one embodiment of a system 100 for lock acquisition in accordance with one embodiment of the present invention. The system 100 includes a lock apparatus 102 in a computer 104, where the computer 104 includes processors 106a-n, each with a thread 108a-n, cache 110a-n, a bus 112, a network interface 114, a memory controller 116, system memory 118 with a lock table 120, an input/output ("I/O") controller 122, data storage 124, a computer network 126, clients 128a-n, external data storage 130, and I/O devices 132, which are described below.

In general, the lock apparatus 102 provides a way to coordinate lock synchronization that reduces traffic on the bus 112 as compared to conventional lock acquisition techniques. The computer may use the MESI coherence protocol. The lock apparatus 102 creates a contention history and combines the contention history with a lock address to form a predictor table index, which may point to lock predictions stored in a predictor table. The contention history and lock address are used to determine a lock prediction, which may be a prediction with regard to whether or not the lock is contended or may be a prediction of a degree of contention. The lock prediction may then be used to determine a lock acquisition strategy, such as to attempt to acquire the lock without delay or to wait to attempt to acquire the lock. The lock apparatus 102 is described in more detail with regard to the apparatuses 200, 300 of FIGS. 2 and 3.

The lock apparatus 102 is depicted in the computer 104, but may be located in various components and memory of the computer 104. For example, the lock apparatus 102 may include counters, registers, and other hardware. In another example, the lock apparatus 102 is implemented in software and all or a portion may be stored in the system memory 118, in data storage 124 on the computer 104, in external data storage 130, etc. In another embodiment, the lock apparatus 102 is implemented in software and hardware. One of skill in the art will recognize other implementations of a lock apparatus 102 using hardware, software or both.

The computer 104 may include any computer or system of computers with a lock synchronization system where multiple threads contend for a lock. In one embodiment, the computer 104 is a server. For example, the server may connect to one or more clients 128a-n through a computer network 126. In other embodiments, the computer 104 may be a workstation, a desktop computer, a laptop computer, a tablet, a mainframe computer, a rack-mounted computer, etc. In another embodiment, the computer 104 may include one or more virtual machines and a hypervisor. The virtual machines may each include a processor 106 or may have a virtual processor where the virtual processors share a pool of processors 106. In another embodiment, the computer 104 includes multiple computers that execute threads in an environment where locks are used. One of skill in the art will recognize other implementations of a computer 104 with a lock apparatus 102 as described herein.

The computer 104, in one embodiment, is a multi-core computer and includes one or more processors 106a-n (collectively "106"), and each processor 106 may execute a thread 108a-n (collectively "108") such that the threads 108 are executed in parallel. In other embodiments, a processor 106 may include multiple cores and each core may concurrently execute a thread 108. Each core or processor 106 may include cache 110a-110n (collectively "110"). Cache 110 may be used to store data of an executing thread 108. The cache 110 may include multiple levels of cache.

In one embodiment, the computer 104 includes a bus 112. A single bus 112 is depicted in the system 100 of FIG. 1, but one of skill in the art will recognize that the computer 104 may include multiple busses, and may include a north bridge and a south bridge or other architecture with multiple buses. The bus 112 connects various components within the computer 104.

The computer 104, in one embodiment, includes a network interface 114 that may be used to connect to the computer network 126. In another embodiment, the computer 104 includes a memory controller 116 connecting to system memory 118 where the system memory 118 includes a lock table 120. The memory controller 116, in one embodiment, controls memory contents within the computer 104, including the system memory 118, and may also control and/or access contents of the cache 110. One of skill in the art will recognize other functions of the memory controller 116. The system memory 118, in one embodiment, includes memory that may be used by various processes, executing software, etc. For example, the system memory 118 may be volatile memory, non-volatile memory, or a combination of both. For example, the system memory 118 may include random access memory ("RAM"), erasable/programmable read only memory ("EPROM"), flash memory, or other memory types.

In one embodiment, the system memory 118 includes a lock table 120. The lock table 120, in one embodiment, includes a location where lock information is stored. For example, a lock may be represented by a bit where a logic 0 signifies that the lock is available and a logic 1 signifies that the lock is owned by a thread or process. In one embodiment, when a processor (e.g. processor 0 106a) with a thread (e.g. thread 0 108a) acquires a lock, the processor (processor 0 106a) may store a logic 1 in the lock bit to signal to other threads (e.g. 108b-n) that the lock is being used by the thread 0 108a. The lock, which is a bit location, typically includes a lock address. The lock address is typically the location of the lock which is available to various threads and processors. The lock address, in one example, may also be used as an identifier. The lock typically corresponds to one or more resources where a single thread is able to use the resource at one time.

For example, if thread 0 108a acquires the lock, processor 0 106a may store a logic "1" at the location of the bit in the lock table 120 corresponding to the lock. Processor 0 106a may also store a copy of the lock in cache 0 110 associates with processor 0 106a. If other threads (e.g. thread 1 108b, thread 2 108c) want the lock, the lock is "contended" and the processors (e.g. processor 1 106b, processor 2 106c) associated with threads 1 108b and thread 2 108c may copy the contents of the bit for the lock to the caches associated with the threads (cache 2 110b, cache 2 110c). When thread 0 108a is finished with the resource, processor 0 106a may then release the lock by copying a logic 0 to the lock location. However, using the MESI coherence protocol complicates the lock acquisition and causes increased traffic on the bus 112. The limitations and complications of the MESI coherence protocol are known in the art.

The lock table 120 may include locks for numerous resources where each bit includes a different address. In one embodiment, the lock table 120 is implemented in hardware, for example, using a register. In another embodiment, the lock table 120 is implemented in software as a software table. The computer 104 may also include an I/O controller 122 that controls one or more input/output devices, such as external data storage 130, or other I/O devices 132, such as a keyboard, mouse, electronic display, etc. One of skill in the art will recognize other forms of an I/O controller 122 and connected devices.

Figure 2:
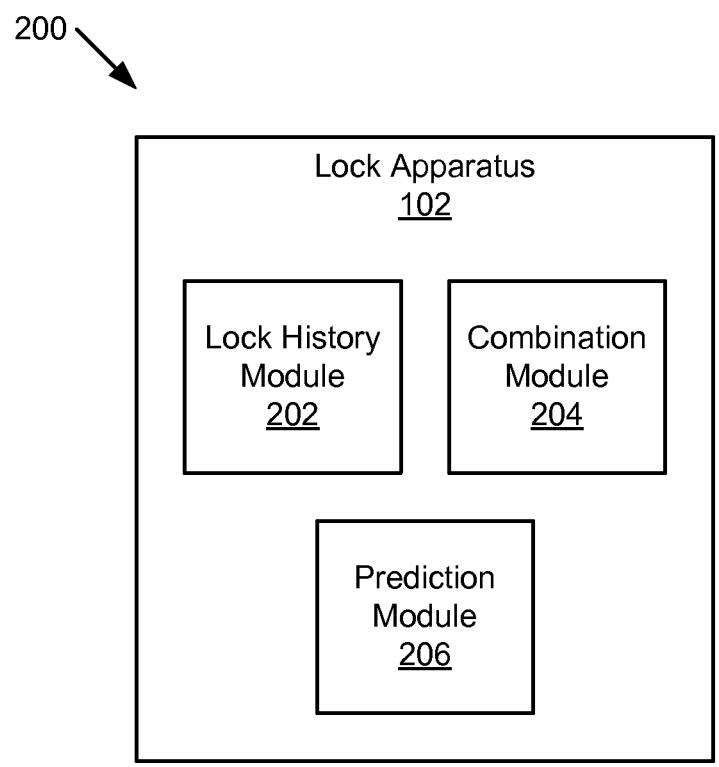
FIG. 2 is a schematic block diagram illustrating one embodiment of an apparatus for lock acquisition in accordance with one embodiment of the present invention.

FIG. 2 is a schematic block diagram illustrating one embodiment of an apparatus 200 for lock acquisition in accordance with one embodiment of the present invention. The apparatus 200 includes one embodiment of a lock apparatus 102 with a lock history module 202, a combination module 204, and a prediction module 206, which are described below.

The apparatus 200, in one embodiment, includes a lock history module 202 that adds a current contention state of a lock to a contention history of the lock. The lock includes a memory location for storing information used for excluding accessing a resource by one or more threads (e.g. threads 1 to thread n 108b-n) while another thread (e.g. thread 0 108a) accesses the resource. For example, if a thread (e.g. thread 0 108a) accesses a lock and the lock state is logic 0 and other threads (e.g. threads 1 to thread n 108b-n) are not attempting to acquire the lock, the current contention state for the lock may be "un-contended," which may be represented by a logic 0. If thread 0 108a has acquired the lock and thread 1 108b or other threads attempt to acquire the lock, the lock may be "contended," which may be represented by a logic 1.

The contention history, in one embodiment, may be string of logic 1s and 0s. In another embodiment, the contention history is a software table and a contention state may be represented by a "true" or a "false," or other variable. Any mechanism that allows for tracking contended and un-contended states of a lock may be used. In one embodiment, the contention history includes a specific number of contention states. Where the contention history is represented by a string of logic 1s and 0s, the contention history may be a memory location of a specific length where each bit at the memory location represents a contention state. For example, if a memory location is 64 bits, each bit may represent a contention state. In one embodiment, the current contention state includes a contended bit where the contended bit is a logic "1" when the lock is contended and is a logic "0" when the lock is not contended and the lock history module 202 adds the contended bit to an end of a series of bits, where the series of bits form the contention history.

In one embodiment, the contention history is for a thread and may be called a global lock contention history where a single contention history value is used to track the contention state of locks accessed by a thread. In the embodiment, the lock history module 202 adds the current contention state of the lock to the global lock contention history. The global lock contention history, in one example, is for recent locks. For example, threads 0-n 108a-n may each have a corresponding global lock contention history. The global lock contention history for thread 0 108a may access locks A, B, C, and D and for each lock access, the actual contended state of the lock being accessed is added to the global lock contention history for thread 0 108a. Experience tracking how threads access locks has shown that a contention history for a thread is useful in predicting whether or not a particular lock will be contended. For example, several threads (e.g. threads 0-n 108a-n) may be from one application and have a tendency to access one lock or a group of locks about the same time so a global lock contention history for a thread showing contentions for the group of locks may help determine if a next lock access will be contended. In some embodiments, the lock history module 202 maintains contention histories for locks and contention histories for threads (e.g. global lock contention histories).

In one embodiment, the lock history module 202 adds the current contention state to the contention history by shifting each contention state and adding the current contention state to the end of the contention history. For example, the contention history may be represented by a shift register where the oldest contention state falls off the end as bits are shifted one position to make room for the current contention state. In another embodiment, the lock history module 202 replaces a contention state with a current contention state on a rolling basis where an oldest contention state is replaced. For example, a software table may include a pointer and the contention state at the pointer is replaced and the pointer is then moved to a next oldest location.

In another embodiment, the contention history is represented by a counter and a current contention state of "contended" increases the counter and a current contention state of "un-contended" decreases the counter. In the embodiment, one version may have a maximum count and a minimum count. One of skill in the art will recognize other ways for the lock history module 202 to add a current contention state to a contention history.

The apparatus 200, in one embodiment, includes a combination module 204 that combines the contention history for the lock being accessed or of a thread accessing the lock with an address for the lock (e.g. "lock address") to form a predictor table index. In one embodiment, the combination module 204 combines the contention history and the lock address by concatenating the contention history and the lock address. For example, the lock address may be 32 bits and the contention history may be 32 bits and the resulting predictor table index may be 64 bits with the lock address at the most significant 32 bits and the contention history as the least significant 32 bits, or vice versa. One of skill in the art will recognize that the lock address and the contention history may be other lengths. By combining the contention history of the lock and the lock address, the lock address identifies the particular contention history for the specific lock. Where the contention history is a global lock contention history of a thread, combining the global lock contention history of the thread accessing the lock with the lock address, the resulting predictor table index is specific to the lock at the point in time that the thread accesses the lock and is useful in predicting whether the lock being accessed is contended or not. A thread accessing the predictor table index for the lock then has access to the contention history. In one embodiment, the combination module 204 combines the contention history for the lock or thread accessing the lock with the address for the lock by concatenating the contention history and the lock address to form the predictor table index or combines the contention history and the lock address using an XOR function to form the predictor table index.

The apparatus 200, in one embodiment includes a prediction module 206 that uses the predictor table index to determine a lock prediction for the lock, where the prediction includes a determination of an amount of contention. The prediction module 206 may determine the amount of prediction by assessing a number of times that the lock is contended in the contention history compared to a number of times in the contention history that the lock is un-contended. For example, where the contention history includes bits where a logic 1 is contended and logic 0 is un-contended, the prediction module 206 may determine the number of logic 1s in the contention history. For example, if the contention history is 16 bits and 14 of the bits are a logic 1, the prediction module 206 may determine that the lock has a history of being contended and may determine that the lock is contended. Various embodiments of determining a lock prediction are discussed below in relation to the apparatus 300 of FIG. 3 and the methods 500, 600 of FIGS. 5 and 6.

In one embodiment, the prediction module 206 determines a lock prediction by creating a lock prediction with a bit where a logic 1 signifies contended and a logic 0 signifies un-contended, or vice versa. In another embodiment, the prediction module 206 creates a two-bit lock prediction that includes four states. The states, in one embodiment, are strongly un-contended, weakly un-contended, weakly contended and strongly contended. The bit states corresponding to the four states may be assigned in any form, but may include 00 for strongly un-contended, 01 for weakly un-contended, 10 for weakly contended and 11 for strongly contended. In other embodiments, the prediction module 206 may include a software implementation and the lock prediction may include a message or table entry with contended/un-contended or other more complex states.

Figure 3:
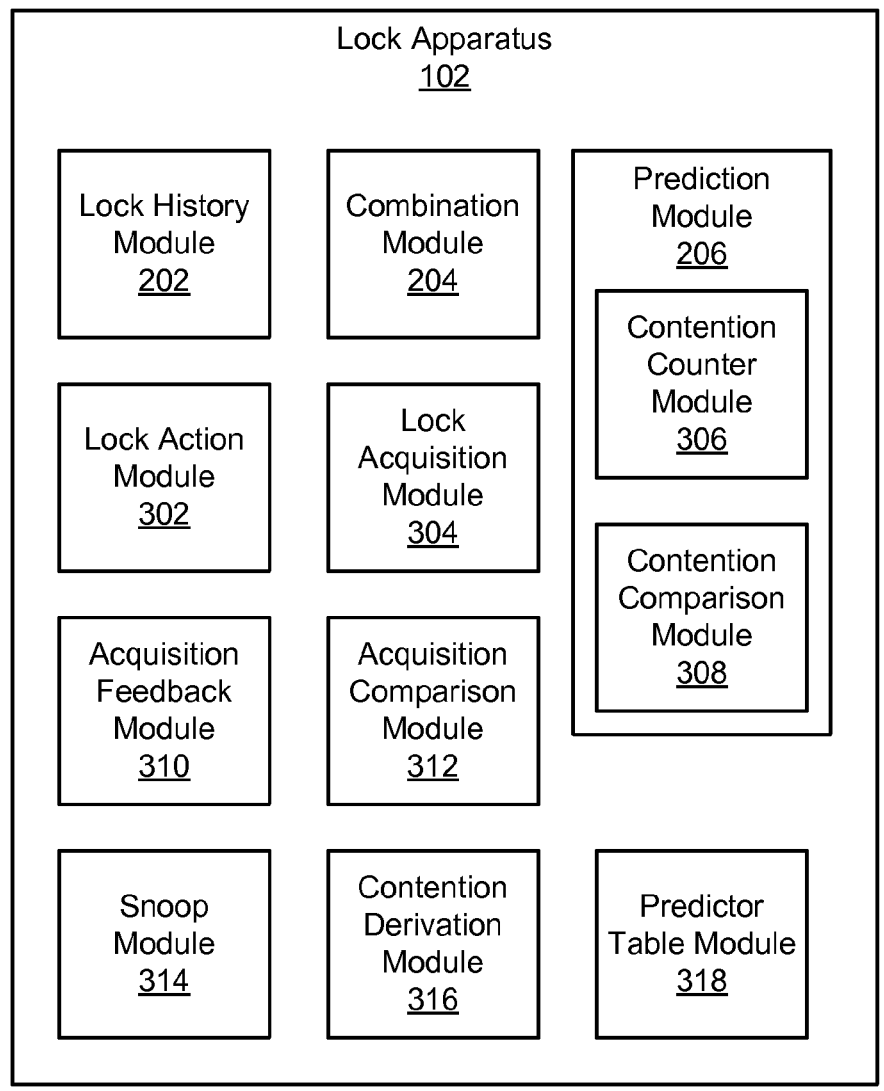
FIG. 3 is a schematic block diagram illustrating another embodiment of an apparatus for lock acquisition in accordance with one embodiment of the present invention.

FIG. 3 is a schematic block diagram illustrating another embodiment of an apparatus 300 for lock acquisition in accordance with one embodiment of the present invention. The apparatus 300 includes one embodiment of a lock apparatus 102 with a lock history module 202, a combination module 204, and a prediction module 206, which are substantially similar to those described above in relation to the apparatus 200 of FIG. 2. In various embodiments, the apparatus 300 may include a lock action module 302, a lock acquisition module 304, a prediction module 206 with a contention counter module 306 and a contention comparison module 308, an acquisition feedback module 310, an acquisition comparison module 312, a snoop module 314, a contention derivation module 316, and a predictor table module 318, which are described below.

In one embodiment, the apparatus 300 includes a lock action module 302 that determines a lock acquisition strategy for acquiring the lock in response accessing the lock prediction for the lock. For example, where the lock prediction is un-contended, the lock action module 302 may determine a lock acquisition strategy of immediately attempting to acquire the lock, or may start a spinning strategy of retrying to acquire the lock until successful. In another example, where the lock prediction is contended, the lock action module 302 may determine a lock acquisition strategy of waiting to attempt to acquire the lock until after a delay, which is a yielding strategy. In other embodiments where the lock prediction includes more complex states, various the lock acquisition strategy may incorporate various amounts of delay depending on the state. For example, a first lock acquisition strategy includes attempting to acquire the lock without delay in response to the lock prediction including a prediction of un-contended and a second lock acquisition strategy includes attempting to acquire the lock after a delay in response to the lock prediction comprising a prediction of contended. Other embodiments may include more complex lock acquisition strategies, such spinning after a delay, adding an additional delay if the lock is contended at the end of the delay, etc.

The apparatus 300, in another embodiment, includes a lock acquisition module 304 that attempts to acquire the lock for a thread at a time in accordance with the lock acquisition strategy. For example, if the lock acquisition strategy is to wait a particular amount of time, then at the end of the time the lock acquisition module 304 may attempt to acquire the lock. In one embodiment, the lock acquisition module 304 attempts to acquire the lock for a thread 108 at a time in accordance with the lock acquisition strategy without attempting to acquire the lock prior to a time designated by the lock acquisition strategy. By accessing the contention history and associated lock acquisition strategy, a thread 108 may determine if the lock is contended with less traffic on the bus 112 than other conventional lock methods.

If the lock acquisition strategy is to immediately attempt to acquire the lock, the lock acquisition module 304 may attempt to acquire the lock without any intentional delay. In one embodiment, the lock acquisition module 304 may attempt to acquire the lock by reading the lock and returning the state of the lock. Where the lock is available, the lock acquisition module 304 may write a logic 1 to the lock and may signal the associated thread 108 to begin accessing the resource associated with the lock. Where the lock is unavailable, e.g. the lock is a logic 1, the lock acquisition module 304 may return the contended state. The lock acquisition module 304 may also cooperate with the lock history module 202 to return the current status of the lock so that the lock history module 202 may add the current contended state to the contention history. One of skill in the art will recognize other functions of the lock acquisition module 304.

In one embodiment, the apparatus 300 includes a prediction module 206 with a contention counter module 306 that uses the contention history to determine a lock prediction for the lock by determining a number of instances of a contended state in the contention history. For example, where the contention history is a series of bits where a logic 1 represents contended and a logic 0 represents un-contended, the contention counter module 306 may count the number of logic 1s in the contention history. In another embodiment, the contention counter module 306 includes a counter where the lock history module 202 increases the counter for a contended state and decreases the counter for an un-contended state and the contention counter module 306 reads a current count in the counter. In another embodiment, the contention history may be a table and the contention counter module 306 reads the table to determine a number of contented states in the contention history.

In the embodiment, the prediction module 206 includes a contention comparison module 308 that compares the number of instances of a contended state in the contention history with a contention threshold. For example, if the contention history includes a series of 32 bits, the contention threshold may be set at 16. Other embodiments may include a higher or lower contention threshold. In the embodiment, the prediction module 206 determines that the lock prediction is contended where the number of instances of a contended state exceeds the contention threshold and determines that the lock prediction is un-contended where the number of instances of a contended state does not exceeding the contention threshold. In a situation where the contention threshold is a number that might be equal to a count from the contention counter module 306, a count that equals the contention threshold (e.g. greater than or equal to), in one embodiment, signifies a contended state and, in another embodiment, signifies an un-contended state (e.g. less than or equal to).

In one embodiment where the lock prediction includes multiple states, two or more thresholds may be used to determine the lock prediction state. In another embodiment, the lock prediction includes more than two states where each successive state corresponds to an increased amount of contention and where each lock acquisition strategy corresponding to a lock prediction state includes an amount of delay prior to attempting to acquire the lock. A lock acquisition strategy with a greater amount of delay corresponds to a lock prediction of a higher contention state and a lock acquisition strategy with a lower amount of delay corresponds to a lock prediction of a lower contention state. For example, the lock prediction may include a strongly un-contended state, a weakly un-contended state, a weakly contended state, and a strongly contended state and the contention comparison module 308 may compare the count from the contention counter module 306 with three contention thresholds, such as a lower contention threshold, a middle contention threshold, and an upper contention threshold to determine which state the count from the contention counter module 306 falls.

In one embodiment, the prediction module 206 may determine that the lock prediction is strongly contended in response to the number of instances of a contended state exceeding the upper contention threshold, the lock prediction is weakly contended in response to the number of instances of a contended state exceeding the middle contention threshold and not exceeding the upper contention threshold, the lock prediction is weakly un-contended in response to the number of instances of a contended state exceeding the lower contention threshold and not exceeding the middle contention threshold, or the lock prediction is strongly un-contended in response to the number of instances of a contended state not exceeding the lower contention threshold. Other numbers of states may be used along with other thresholds.

Other more complex states may also be used. For example, the prediction module 206 may use more complex analysis of the contention history to determine a lock prediction. For instance, more recent contention history may be weighted more than older contention history. For example, a contention history may include 16 contention states and the most recent 8 contention states may be weighted more heavily than older contention states. Other embodiments may include different weightings for various parts of the contention history. For example, the oldest 8 contention states may have no weighting, the next oldest 4 contention states may include a first level of weighting, and the newest 4 contention states may be weighted more heavily than the first level of weighting. One of skill in the art will recognize other ways that the prediction module 206 may determine a lock prediction.

In another embodiment, the lock action module 302 may use a combination of the lock prediction and the contention history to determine a lock acquisition strategy. For example, the prediction module 206 may determine an overall lock prediction and a most recent lock prediction and the lock action module 302 may use both to determine a lock acquisition strategy.

In one embodiment, the apparatus 300 includes a feedback mechanism that may be used to adjust a lock prediction and/or a lock acquisition strategy. For example, the apparatus 300 may include an acquisition feedback module 310 that returns a lock status of the lock in response to an attempt to acquire the lock. The lock status includes a status of the lock at the time of the attempt to acquire the lock. In the example, the apparatus 300 may include an acquisition comparison module 312 that compares the lock status with the lock prediction and returns a prediction confirmation message based on the comparison. The prediction confirmation message may include whether or not the lock status matches the lock prediction.

For example, the prediction module 206 may return a lock prediction of un-contended and the lock action module 302 may then determine a lock acquisition strategy to immediately attempt to acquire the lock. The lock acquisition module 304 may then read the lock in an attempt to acquire the lock. If the lock is available, the acquisition feedback module 310 may return an un-contended state and the acquisition comparison module 312 may compare the lock prediction, which is un-contended with the lock status, which is un-contended and may then send a prediction confirmation message that the lock prediction matched the lock status.

If the lock is unavailable, the acquisition feedback module 310 may return a contended state and the acquisition comparison module 312 may compare the lock prediction, which is un-contended, with the lock status, which is contended, and may then send a prediction confirmation message that the lock prediction did not match the lock status. The prediction module 206 may then use the prediction confirmation message to determine the lock prediction for the lock. For example, the prediction module 206 may adjust the contention threshold.

Where the lock prediction is contended, the lock acquisition strategy may be to delay attempting to acquire the lock. The apparatus 300 may include feedback during a delay to acquire the lock. For example, the apparatus 300 may include a snoop module 314 that tracks a number of times that one or more other threads (e.g. thread 1-n 108b-n) attempt to acquire the lock during a delay between a time when a first thread (e.g. thread 0 108a) reads the lock prediction when the lock prediction is in a contended state and when the first thread (e.g. thread 0 108a) attempts to acquire the lock. With the apparatus 300 as part of the computer 104, threads 108 may read a lock prediction from the prediction module 206 rather than reading the lock. The snoop module 314 may track reads of the lock prediction during the delay.

The apparatus 300 may also include a contention derivation module 316 that derives a contended status of the lock based on the number of times that the one or more other threads (threads 1-n 108b-n) attempt to acquire the lock during the delay. For example, the snoop module 314 may include a snoop threshold and a certain number of lock acquire attempts by other threads may signify a contended lock. The snoop threshold may be 1 so that any reads by a thread during the delay signifies a contended status. Higher snoop thresholds may also be used. In the embodiment, the prediction module 206 may include a contention comparison module 308 that compares the derived contended status with the lock prediction and returns a prediction confirmation message based on the comparison. The prediction confirmation message includes whether or not the derived contended status matches the lock prediction.

The prediction module 206 may use the prediction confirmation message to determine the lock prediction for the lock. For example, where the contended status does not match the lock prediction, the prediction module 206 may adjust the contention threshold or the lock action module 302 may make adjustments to the lock acquisition strategy. One of skill in the art will recognize other ways that the prediction module 206 and/or lock action module 302 may use a prediction confirmation message as feedback to adjust a lock prediction and/or a lock acquisition strategy.

In one embodiment, the apparatus 300 includes a predictor table module 318 that stores lock predictions in a predictor table where the predictor table index points to the lock predictions in the predictor table. The prediction module 206 may then access the predictor table to determine the lock prediction for the lock. For example, the lock address of a predictor table index may point to a particular table or portion of a table and each possible contention history may point to a table location with a corresponding lock prediction. As a simple example, if a contention history included four bits, there are 16 possible combinations of logic 1s and 0s so the predictor table may have 16 locations. If a contention history with 2 or more contended bits signifies a contended state, then each contention history with 2 or more logic is (e.g. 1111, 0111, 1011, 1101, 1110, 1100, 1001, 0011, 0110, 0101, and 1010) map to locations in the predictor table with a "contended" state and each contention history with zero or one logic 1s (e.g. 0000, 0001, 0010, 0100, and 1000) maps to a location with an "un-contended" state.

Figure 4:
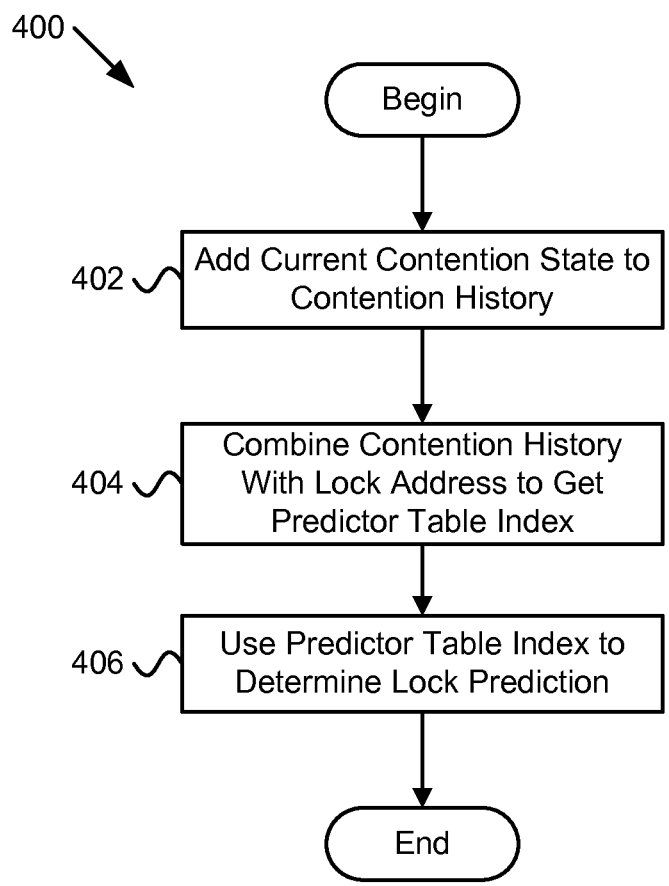
FIG. 4 is a schematic flow chart diagram illustrating one embodiment of a method for lock acquisition in accordance with one embodiment of the present invention.

FIG. 4 is a schematic flow chart diagram illustrating one embodiment of a method 400 for lock acquisition in accordance with one embodiment of the present invention. The method 400 begins and adds 402 a current contention state of a lock to a contention history. The contention history may be a contention history of the lock or a global lock contention history of a thread. The lock includes a memory location for storing information used for excluding accessing a resource by one or more threads while another thread accesses the resource. In one embodiment, the lock history module 202 adds 402 the current contention state to the contention history.

The method 400 combines 404 the contention history with a lock address for the lock to form a predictor table index and uses 406 the predictor table index to determine a lock prediction for the lock, where the prediction includes a determination of an amount of contention, and the method 400 ends. In some embodiments, the combination module 204 combines 404 the contention history with the lock address and the prediction module 206 uses 406 the contention history to determine a lock prediction.

Figure 5:
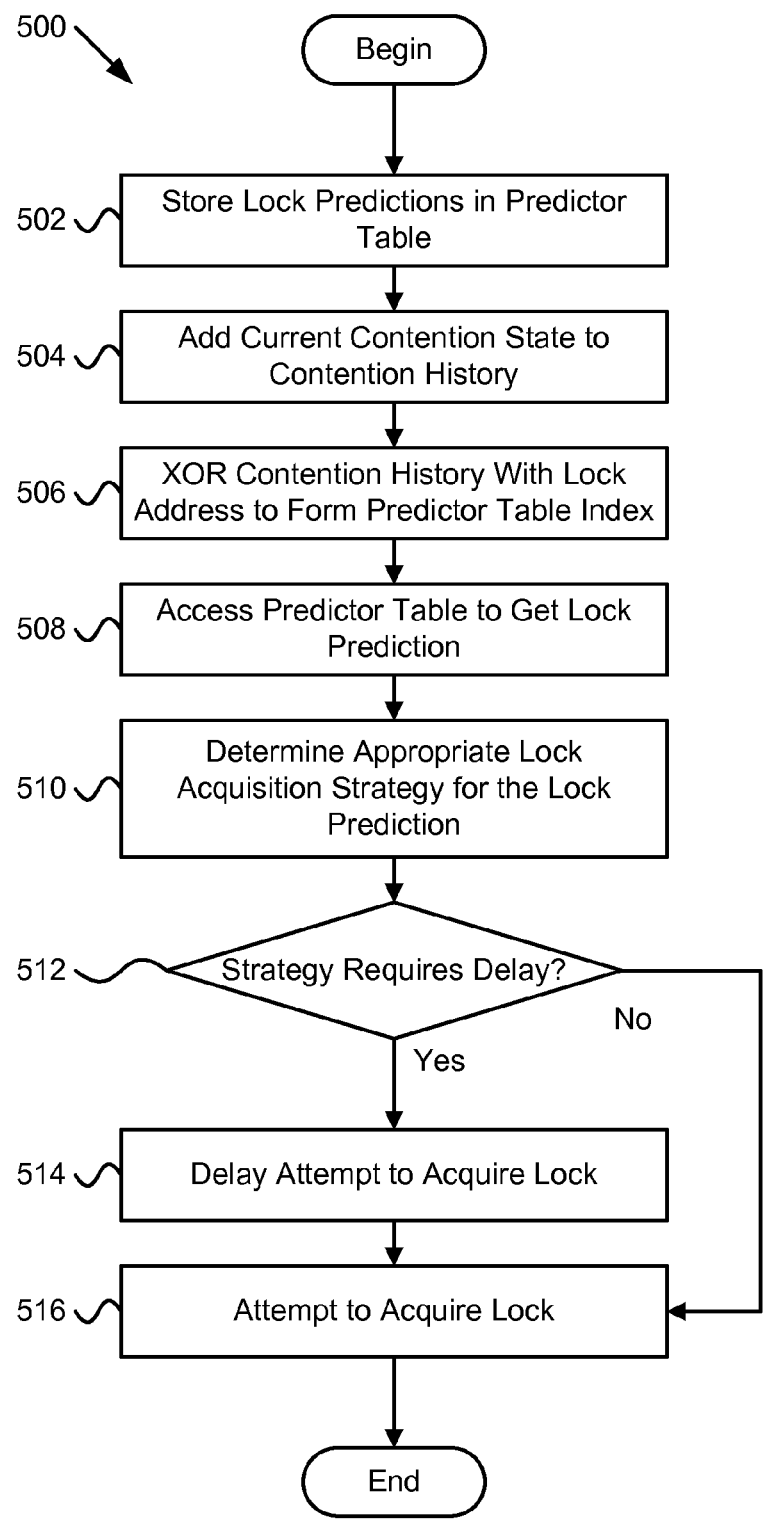
FIG. 5 is a schematic flow chart diagram illustrating one embodiment of a method for lock acquisition when XORing a contention history with a lock address in accordance with one embodiment of the present invention.

FIG. 5 is a schematic flow chart diagram illustrating one embodiment of a method 500 for lock acquisition when XORing a contention history with a lock address in accordance with one embodiment of the present invention. The method 500 begins and stores 502 lock predictions for a lock in a predictor table. For example, the predictor table module 318 may store the lock predictions in the predictor table. The lock predictions may be stored so that possible lock contention histories correspond to the various lock predictions.

The method 500 adds 502 a current contention state of a lock to a contention history and performs 504 an exclusive OR ("XOR") function between the contention history and the lock address to form a predictor table index. For example, the combination module 204 may XOR the lock address and contention history. The method 500 accesses 506 the predictor table based on the predictor table index to get the appropriate lock prediction and the method 500 determines 510 an appropriate lock acquisition strategy for the lock prediction. For example, the prediction module 206 may access 508 the predictor table to determine the lock prediction for the predictor table index and the lock action module 302 may then determine 510 the appropriate lock acquisition strategy for the lock prediction.

The method 500 determines 512 if the lock acquisition strategy requires a delay. If the method 500 determines 512 that the lock acquisition strategy requires a delay, the method 500 delays 514 an attempt to acquire the lock and then, after the delay, attempts 516 to acquire the lock, and the method 500 ends. If the method 500 determines 512 that the lock acquisition strategy does not require a delay, the method 500 attempts 516 to acquire the lock without the delay, and the method 500 ends. In one embodiment, the lock action module 302 determines 512 if the lock acquisition strategy requires a delay and the lock acquisition module 304 attempts 516 to acquire the lock.

Figure 6:
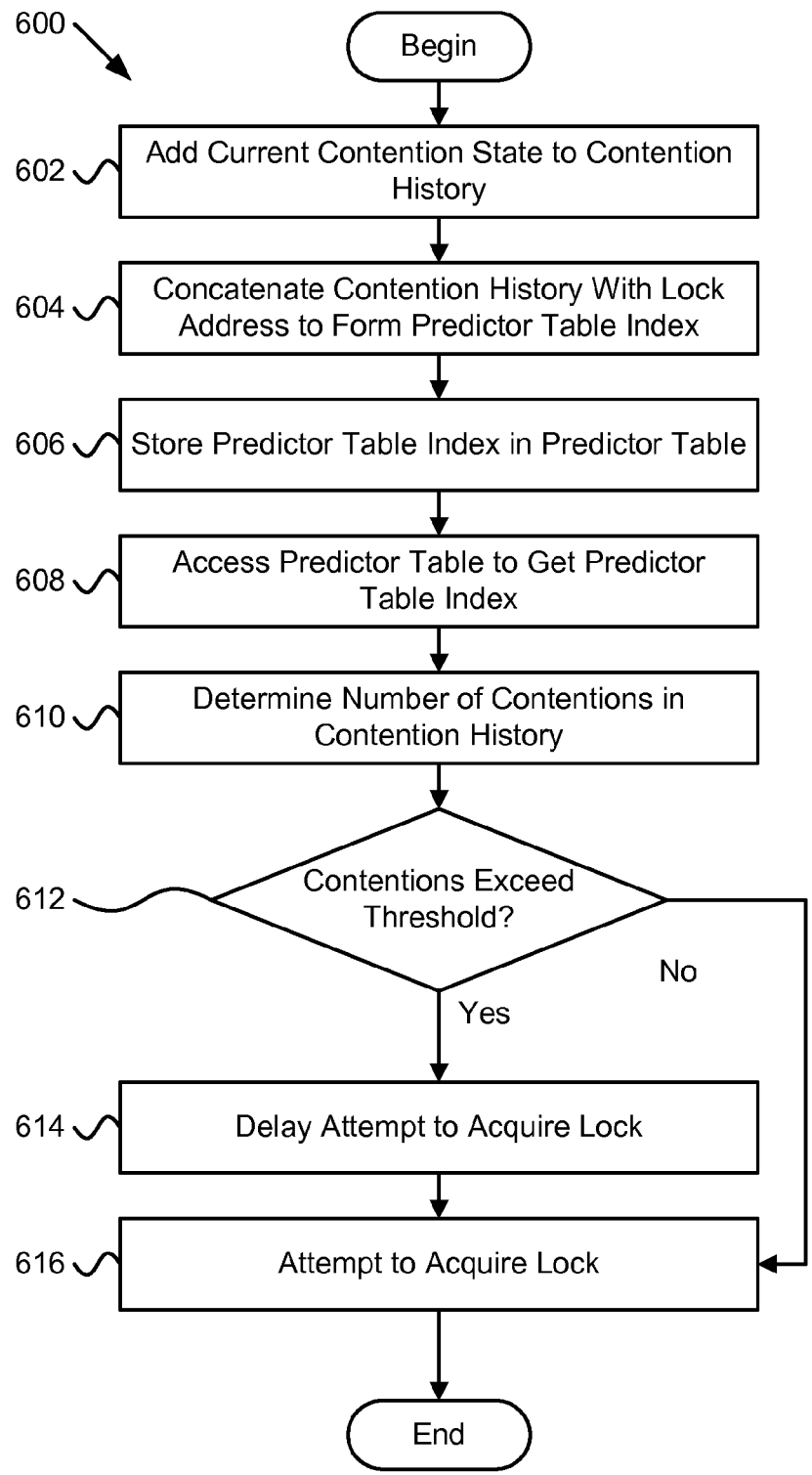
FIG. 6 is a schematic flow chart diagram illustrating one embodiment of a method for lock acquisition when concatenating a contention history with a lock address in accordance with one embodiment of the present invention.

FIG. 6 is a schematic flow chart diagram illustrating one embodiment of a method 600 for lock acquisition when concatenating a contention history with a lock address in accordance with one embodiment of the present invention. The method 600 begins and adds 602 a current contention state of a lock to a contention history, concatenates 604 the contention history with the lock address to form a predictor table index, and stores 606 the predictor table index in the predictor table. The method 600 accesses 608 the predictor table to get the proper predictor table index for a lock and uses the contention history portion of the predictor table index to determine 610 the number of contentions in the contention history. For example, the combination module 204 may concatenate 604 the contention history and lock address and store 606 the predictor table index and the prediction module 206 may access 608 the predictor table index from the predictor table and may determine 610 the number of contentions in the contention history. The number of contentions is typically the number of contended states in the contention history.

The method 600 determines 612 if the number of contentions in the contention history exceeds the contention threshold. If the method 600 determines 612 that the number of contentions in the contention history exceeds the contention threshold, which signifies a lock prediction of "contended," the method 600 delays 614 attempts by the thread 108 seeking the lock to acquire the lock. After the delay, the method 600 attempts 616 to acquire the lock, and the method 600 ends. If the method 600 determines 612 that the number of contentions in the contention history does not exceed the contention threshold, which signifies a lock prediction of "un-contended," the method 600 attempts 616 to acquire the lock, and the method 600 ends.

Figure 7:
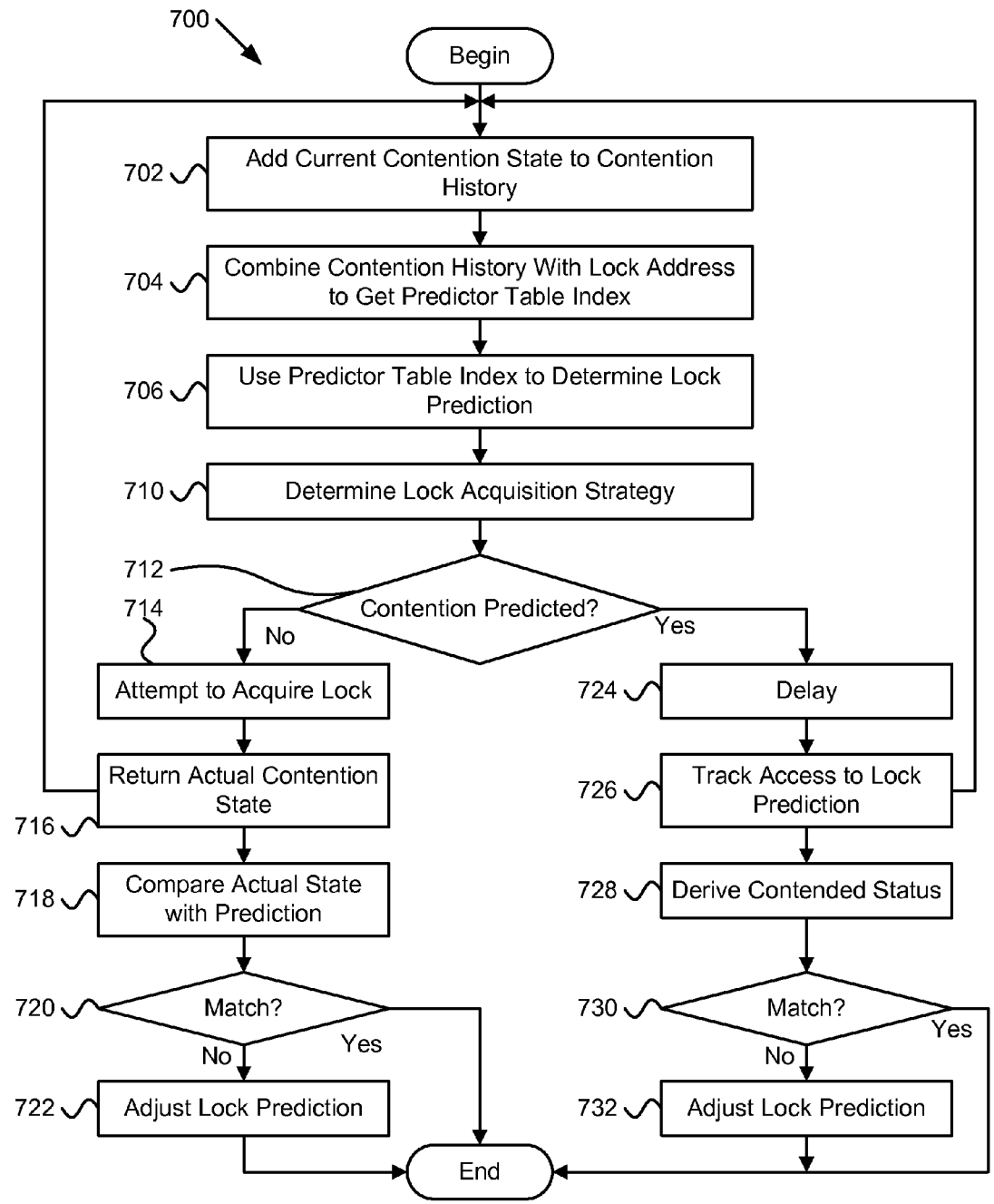
FIG. 7 is a schematic flow chart diagram illustrating one embodiment of a method for lock acquisition with feedback in accordance with one embodiment of the present invention.

FIG. 7 is a schematic flow chart diagram illustrating one embodiment of a method 700 for lock acquisition with feedback in accordance with one embodiment of the present invention. The method 700 begins and adds 702 a current contention state of a lock to a contention history, combines 704 the contention history with a lock address for the lock to form a predictor table index, uses 706 the predictor table index to determine a lock prediction for the lock, and determines 710 a lock acquisition strategy for the lock based on the lock prediction for the lock.

The method 700 determines 712 if contention is predicted in the lock prediction. If the method 700 determines 712 that the lock prediction is un-contended, the method 700 attempts 714 to acquire the lock. The method 700 returns 716 the actual contention state, for example to add 702 to the contention history. The method 700 compares 718 the actual contention state with the lock prediction and determines 720 if the actual contention state matches the lock prediction. If the method 700 determines 720 that the actual contention state does not match the lock prediction, the method 700 adjusts the lock prediction, for example by adjusting a contention threshold, and the method 700 ends. If the method 700 determines 720 that the actual contention state matches the lock prediction, the method 700 ends.

If the method 700 determines 712 that the lock prediction is contended, the method 700 delays 724 acquisition of the lock. During the delay, the method 700 tracks 726 access to the lock prediction by other threads and derives 728 an actual contended status for the lock. The method 700 may return reads of the lock prediction to be used in the contention history. For example, a thread 108 accessing the predictor table index of a lock may signify a contended state for the lock. The method 700 determines 730 if the actual contended status matches the lock prediction of contended. If the method 700 determines 730 that the actual contended status does not match the lock prediction of contended, the method 700 adjusts the lock prediction for the lock, possibly by adjusting a contention threshold of the lock. If the method 700 determines 730 that the actual contended status matches the lock prediction of contended, the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method comprising:
   adding a current contention state of a lock to a contention history, the lock comprising a memory location for storing information used for excluding accessing a resource by one or more threads while another thread accesses the resource;
   combining the contention history with a lock address for the lock to form a predictor table index by one of;
      concatenating the contention history and the lock address to form the predictor table index; and
      combining the contention history and the lock address using an XOR function to form the predictor table index; and
   using the predictor table index to determine a lock prediction for the lock, the prediction comprising a determination of an amount of contention.

2. The method of claim 1, wherein the method comprises a lock acquisition strategy for acquiring the lock in response to accessing the lock prediction for the lock.

3. The method of claim 2, further comprising attempting to acquire the lock for a thread at a time in accordance with the lock acquisition strategy.

4. The method of claim 3, wherein attempting to acquire the lock for a thread at a time in accordance with the lock acquisition strategy further comprises attempting to without attempting to acquire the lock prior to a time designated by the lock acquisition strategy.

5. The method of claim 2, wherein a first lock acquisition strategy comprises attempting to acquire the lock without delay in response to the lock prediction comprising a prediction of un-contended and a second lock acquisition strategy comprising attempting to acquire the lock after a delay in response to the lock prediction comprising a prediction of contended.

6. The method of claim 2, wherein the lock prediction comprises more than two states wherein each successive state corresponds to an increased amount of contention and wherein each lock acquisition strategy corresponding to a lock prediction state comprises an amount of delay prior to attempting to acquire the lock, wherein a lock acquisition strategy with a greater amount of delay corresponds to a lock prediction of a higher contention state and a lock acquisition strategy with a lower amount of delay corresponds to a lock prediction of a lower contention state.

7. The method of claim 1, wherein:
   the current contention state comprises a contended bit wherein the contended bit is a logic "1" when the lock is contended and is a logic "0" when the lock is not contended; and
   the lock history module adds the contended bit to an end of a series of bits, the series of bits comprising the contention history.

8. The method of claim 1, wherein using the predictor table index to determine a lock prediction for the lock further comprises:
   using the contention history to determine a lock prediction for the lock by determining a number of instances of a contended state in the contention history; and comparing the number of instances of a contended state in the contention history with a contention threshold, wherein the lock prediction comprises a contended state in response to the number of instances of a contended state exceeding the contention threshold and the lock prediction comprises an un-contended state in response to the number of instances of a contended state not exceeding the contention threshold.

9. The method of claim 8, wherein:

the lock prediction comprises a strongly un-contended state, a weakly un-contended state, a weakly contended state, and a strongly contended state;

the contention comparison module compares the number of instances of a contended state in the contention history with a lower contention threshold, a middle contention threshold, and an upper contention threshold; and the prediction module determines that
   the lock prediction is strongly contended in response to the number of instances of a contended state exceeding the upper contention threshold;
   the lock prediction is weakly contended in response to the number of instances of a contended state exceeding the middle contention threshold and not exceeding the upper contention threshold;
   the lock prediction is weakly un-contended in response to the number of instances of a contended state exceeding the lower contention threshold and not exceeding the middle contention threshold; and
   the lock prediction is strongly un-contended in response to the number of instances of a contended state not exceeding the lower contention threshold.

10. The method of claim 1, further comprising:

returning a lock status of the lock in response to an attempt to acquire the lock, the lock status comprising a status of the lock at the time of the attempt to acquire the lock;

comparing the lock status with the lock prediction;

returning a prediction confirmation message based on the comparison, the prediction confirmation message comprising whether or not the lock status matches the lock prediction; and using the prediction confirmation message to adjust the lock prediction for the lock.

11. The method of claim 1, further comprising:

tracking a number of times that one or more other threads attempt to acquire the lock during a delay between a time when a first thread reads the lock prediction when the lock prediction is in a contended state and when the first thread attempts to acquire the lock;

deriving a contended status of the lock based on the number of times that the one or more other threads attempt to acquire the lock during the delay; and using the contended status to adjust the lock prediction for the lock.

12. The method of claim 1, further storing lock predictions in a predictor table, wherein the predictor table index points to the lock predictions in the predictor table and using the predictor table index to determine a lock prediction for the lock further comprises accessing the predictor table to determine the lock prediction for the lock.

13. The method of claim 1, wherein the contention history comprises one of a contention history of the lock and a contention history of a thread accessing the lock.

* * * * *